United States Patent Office 3,325,551
Patented June 13, 1967

3,325,551
CATALYTIC CYCLODEHYDROGENATION
PROCESS
George Suld, Springfield, Pa., assignor to Sun Oil Company, Philadelphia, Pa., a corporation of New Jersey
No Drawing. Filed June 1, 1966, Ser. No. 561,652
16 Claims. (Cl. 260—668)

This application is a continuation-in-part of Ser. No. 373,500, filed June 8, 1964 by George Suld which application is a continuation-in-part of Ser. No. 353,272, filed Mar. 19, 1964 by George Suld, both of which are now abandoned.

This invention is a catalytic cyclodehydrogenation process for the conversion of certain types of alkyltetralins, alkylnaphthalenes and alkylbiphenyls to acenaphthene, acenaphthylene, fluorene, alkyl derivatives of these products, and other products described hereinafter, the specific products obtained depending upon the specific starting material employed and, in some cases, the temperature at which the process is carried out. A distinctive feature of the invention is that the ratio of desired product, e.g., acenaphthene, etc. to other products is very high; in other words, the catalyst employed has a high selectively for acenaphthene, etc. acenaphthene, fluorene, and alkyl derivatives thereof are useful in a variety of known applications, e.g., in the synthesis of dyes, in the manufacture of plastics, as insecticides, and as fungicides. Acenaphthylene and alkyl derivatives thereof also have known uses. For example, acenaphthylene is useful as a starting material in a process for making high purity coke, such a process being described in U.S. Patent 3,035,989.

According to the invention an alkyltetralin, alkylnaphthalene or alkylbiphenyl as defined hereinafter is contacted at a temperature in the range of 360° to 525° C. with a catalyst. The catalyst is a ternary system comprising a support of gamma and/or eta alumina which has deposited thereon both platinum metal and a basic alkali metal compound, a basic compound being defined for the present purpose as a carbonate, bircarbonate, oxide, or hydroxide. The products obtained as a result of such contacting will depend upon the specific starting material and, in some cases, the temperature of contacting. With any of the specified starting materials certain types of products are obtained at any temperature within the 360°–525° C. range while at a temperature of 475°–525° C. and with an alkylnaphthalene or alkyltetralin starting material certain other products will be formed in addition.

The starting materials suitable for the present purpose are hydrocarbons and are 1-ethyl-8-unsubstituted-naphthalenes, 1-ethyl-8-unsubstituted-tetralins and 2-alkyl-2'-unsubstituted-biphenyls. The products produced by the method of the invention depend upon the specific starting material and, in some cases, the reaction temperature. The three types of suitable starting materials will be described separately along with the products which can be made therefrom.

A 1-ethyl-8-unsubstituted-naphthalene is any alkylnaphthalene in which the 1-position is substituted with an ethyl group and in which the 8-position contains no substituent. For the present purpose a hydrogen atom attached to a nuclear carbon atom is not considered a substituent. Positions 2 to 7 on the naphthalene nucleus can contain substituents if desired but any such substituents are preferably methyl or ethyl groups. Alkylnaphthalenes as thus described can be indicated by the following formula, wherein each R subscript corresponds to the number, by standard nomenclature, of the nuclear carbon atom to which is is attached.

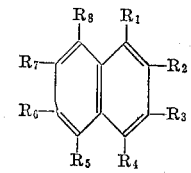

(Formula I)

wherein $R_1$ is ethyl, each of $R_2$–$R_7$ is hydrogen, methyl, or ethyl, and $R_8$ is hydrogen.

The products produced from the starting materials defined by Formula I will depend upon the reaction temperature. Initially, those products produced over the entire 360°–525° C. temperature range will be described after which the additional products produced in the upper end of this range, i.e., 475°–525° C., will be described.

If $R_2$–$R_7$ are hydrogen the product obtained is acenaphthene. Thus,

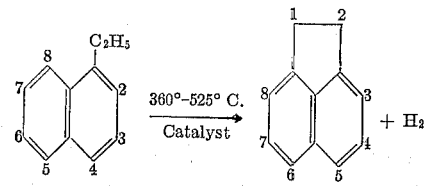

If the starting material contains any methyl or ethyl substituents in the 2, 3, 6, or 7-positions the product will be a methyl or ethylacenaphthene with the substituents being in the corresponding position. For example, if the starting material is 1-ethyl-6-methylnaphthalene the product is 4-methylacenaphthene. Similarly, 1,7-diethyl-3-methylnaphthalene yields 3-ethyl-7-methylacenaphthene. Certain pairs of carbon atoms in acenaphthene are equivalent, namely 3 and 8, 4 and 7, and 5 and 6. In numbering substituents the lowest possible number is used. The same approach is taken in numbering substituents on a biphenyl nucleus or a tetralin nucleus.

If both of the 4 and 5-positions in the starting material contain a substituent the product will be a substituted acenaphthene with the substituents being in the 5 and 6-positions. Thus 1,4-diethyl-5-methylnaphthalene yields 5-ethyl-6-methylacenaphthene. If only one of the 4 and 5-positions in the starting material contains a substituent the product obtained will depend upon whether the substituent is methyl or ethyl. If the substituent is methyl, the product will be a methylacenaphthene with the methyl substituent being in the 5-position. Thus 1-ethyl-5-methylnaphthalene yields 5-methylacenaphthene. If the substituent is ethyl, two products are usually obtained. The major product is always an ethylacenaphthene with the ethyl substituent being in the corresponding position. Thus 1,5-diethylnaphthalene yields, inter alia, 5-ethylacenaphthene. In some cases a small amount of pyracene is obtained.

As mentioned, at temperatures of 475°–525° C. certain products are formed in addition to those mentioned above. The additional products formed are all unsaturated derivatives of those described above and are formed by dehydrogenation of the above-mentioned products. The latter all contain a saturated five membered ring. The additional products are the same except that the five membered ring contains a double bond, which can be, of course, in only one position. By way of example, if acenaphthene is being prepared by the method of the invention acenaphthylene will also be obtained within the 475°–525° C. temperature range. Thus,

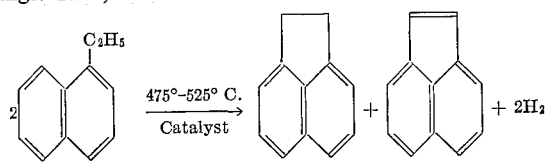

As an additional example, if 4-methylacenaphthene is being prepared use of the higher temperature range will result in the formation of some 4-methylacenaphthylene. Similarly if pyracene is obtained, use of the higher temperatures will result in the dehydrogenation of one of the saturated rings yielding 1,2-dihydropyracylene.

In summary, then, the reaction which occurs in the method of the invention using the compounds defined by Formula I as starting material can be summarized as follows: the ethyl substituent in the 1-position of the starting alkylnaphthalene cyclizes to produce the ring system characteristic of acenaphthene and, in some cases, the ring system characteristic of acenaphthylene. Substituents in the 2, 3, 6, or 7-positions remain unaffected in the method of the invention. A substituent in the 4 or 5-positions will either remain unaffected or will cyclize in the same manner as the substituent in the 1-position.

Of the starting materials defined by Formula I certain ones are preferred. Preferably $R_2$–$R_8$ inclusive are hydrogen in which case the starting material is 1-ethylnaphthalene. If any substituents in addition to $R_1$ are present, they are preferably in the 2, 3, 6, or 7-position.

The starting materials defined by Formula I can be obtained commercially or can be prepared by known methods. These methods normally involve alkylation of naphthalene.

The second type of starting materials suitable for the present purpose is 1-ethyl-8-unsubstituted tetralins, tetralin being an accepted name for certain tetrahydronaphthalenes. These materials are, for the present purpose, the same as the 1-ethyl-8-unsubstituted naphthalenes previously described except that one ring (either one) is saturated. The products obtained from a tetralin starting material are the same (at the same temperature) as obtained from the corresponding naphthalene starting material. Thus 1-ethyltetralin yields acenaphthene although it is not definitely known whether the 1-ethyl-tetralin goes directly to this product or is first converted to 1-ethylnaphthalene which is then converted to acenaphthene. For the present purpose the 1-position of tetralin can be on either ring since 1-ethyl-1,2,3,4-tetrahydronaphthalene yields acenaphthene as does 5-ethyl-1,2,3,4-tetrahydronaphthalene. In other words, for the present purpose tetralin can be identified as either 1,2,3,4-tetrahydronaphthalene or as 5,6,7,8-tetrohydronaphthalene.

Ethyltetralins can be obtained by known techniques such as those described in United States Patent No. 3,223,742.

The other type of starting material suitable for the present purpose is 2 - alkyl - 2′ - unsubstituted - biphenyl wherein the 2-position alkyl is methyl, ethyl, propyl, or isopropyl, i.e., contains 1–3 carbon atoms. Such a compound is any alkylbiphenyl in which the 2-position contains an alkyl substituent having 1–3 carbon atoms and in which the 2′-position contains no substituent. Positions 3 to 6 and 3′ to 6′ can contain substituents if desired but any such substituents are preferably methyl or ethyl gorups. Alkylbiphenyls as thus described can be indicated by the following formula wherein the R subscripts correspond to the nuclear carbon atom numbers as in Formula I.

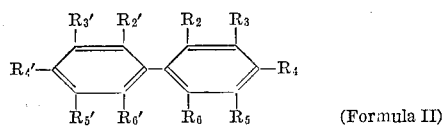

(Formula II)

wherein $R_2$ is methyl, ethyl, propyl, or isopropyl, $R_2'$ is hydrogen, and $R_3$–$R_6$ and $R_3'$–$R_6'$ are hydrogen, methyl, or ethyl.

The products produced from the starting materials defined by Formula II do not vary substantially with temperature within the 360°–525° C. range and will be as follows:

If $R_2$ is methyl and all remaining R's are hydrogen the product is fluorene. Thus,

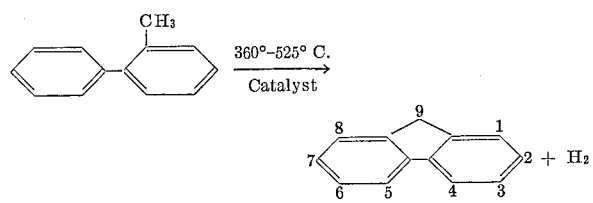

If $R_2$ is ethyl and all remaining R's are hydrogen the product is mainly 9-methylfluorene but a small amount of fluorene will also be formed. If $R_2$ is propyl or isopropyl and all remaining R's are hydrogen the product is mainly 9-ethylfluorene or 9,9-dimethylfluorene respectively, although in each case a small amount of fluorene and methyl fluorene is obtained.

If the biphenyl starting material contains substituents in the 3 to 6 or 3′ to 6′ positions the product will be a fluorene compound containing a substituent in the corresponding position. For example, 2-methyl-4-ethyl-3′-methylbiphenyl yields 2-ethyl-6-methylfluorene. Similarly 2-ispropyl-3,4-dimethyl-4′-ethylbiphenyl yields 1,2,9,9-tetramethyl-7-ethylfluorene.

In summary, then, the reaction which occurs in the method of the invention using the compounds defined by Formula II as starting material can be summarized as follows: The methyl, ethyl, propyl or isopropyl substituent in the 2-position of the starting alkylbiphenyl cyclizes to produce the ring system characteristic of fluorene. Substituents in the 3 to 6 and 3′ to 6′ positions remain unaffected.

It should be noted that certain positions on the biphenyl nucleus are equivalent. For example, the 2′ and 6′ positions are equivalent; consequently 2,2′-dimethylbiphenyl is a suitable starting material for the present purpose because it is the same compound as 2,6′-dimethylbiphenyl.

Of the starting materials defined by Formula II certain ones are preferred. Preferably $R_3$–$R_6$ and $R_3'$–$R_6'$ are hydrogen. $R_2$ is preferably isopropyl.

The catalyst employed in the method of the invention comprises platinum metal and a basic alkali metal compound deposited on a support of gamma or eta alumina or mixtures thereof. Gamma and eta alumina are known forms of alumina and can be prepared by known methods. The preparation of both of these types of alumina is described in U.S. Patent No. 2,796,326 issued to C. N. Kimberlin et al. This patent is mainly concerned with the preparation of eta alumina and discloses a method of preparing same. It also discloses, however, that if certain procedures are not followed the product will contain substantial amounts of gamma alumina. The preparation of alumina containing over 95% gamma alumina is specifically described.

As described in the aforesaid Kimberlin et al. patent eta alumina is prepared by a procedure which involves reacting aluminum with an alcohol in the presence of a catalyst such as $HgCl_2$ to form aluminum alcoholate. The alcohol is preferably a water immiscible alcohol such as amyl alcohol and is preferably diluted with about 1 volume per volume of alcohol of a petroleum distillate boiling in the range of about 93°–260° C. One reason for using the petroleum distillate is that it serves as a solvent for the solid aluminum alcoholate. The amount of aluminum is preferably such that the resulting solution contains 5–15% aluminum alcoholate. All percentages herein are by weight. The alcoholate solution is then hydrolyzed by mixing it with 7–10 volumes of water per volume of alcoholate solution with good agitation. The hydrolysis temperature should be 0°–21° C. Hydrolysis of the alcoholate causes regeneration of the alcohol originally used. Completion of the hydrolysis step results in a two-phase system, one phase being an aqueous hydrous alumina slurry, the other phase containing the alcohol and petroleum distillate diluent. The latter phase is decanted and the aqueous hydrous alumina slurry is then held at, i.e., aged, at about 18–21° C. for about 65 hours. Drying the aged slurry at 90°–120° C. yields beta alumina trihydrate and the latter is converted in essentially quantitative yield to essentially pure eta alumina by further dehydration at 340–650° C., preferably in the presence of air.

It is also disclosed in the Kimberlin et al. patent that if the amount of water employed in the hydrolysis step is only 1 volume water per volume of alcoholate solution instead of 7–10 volumes, the alumina product ultimately obtained will contain less than 5% eta alumina, the balance being gamma alumina. In other words the drying at 90°–120° C. yields less than 5% beta alumina trihydrate, the balance being alpha alumina monohydrate which is the precursor of gamma alumina. Similarly, if the aging time is 2 hours rather than 65 hours, the ultimate alumina product will contain only about 10% eta alumina, the balance being gamma alumina.

It is preferred for the present purpose that the alumina support have a surface area of at least 275 square meters per gram as determined by the well known BET method. It is known that the surface area of gamma or eta alumina is determined mainly by the temperature at which the corresponding hydrate is dehydrated. See, for example, Newsome et al., Alumina Properties, Technical Paper No. 10, 2d Revision, Aluminum Co. of America (1960). In order to obtain gamma or eta alumina having a surface area of at least 275 m.$^2$/gm. the beta alumina trihydrate (which dehydrates to eta alumina) or the alpha alumina monohydrate (which dehydrates to gamma alumina) should be dehydrated at a temperature of about 400° C.

Incorporation of platinum metal on the alumina support can be effected by known techniques. The usual technique involves saturating the alumina support with an aqueous solution of a water soluble platinum compound such as chloroplatinic acid. The wet alumina is then heated to, say, 150°–260° C. to remove essentially all of the water after which the alumina is heated to, say, 275°–550° C. in an atmosphere of hydrogen in order to convert, i.e., reduce, all the platinum to platinum metal. By varying the platinum content of the aqueous platinum solution the platinum content of the final catalyst can be varied. For the present purpose the catalyst should contain 0.05–4% platinum metal, more preferably 0.2–2%, the percentages being based upon the total catalyst weight, i.e., the total weight of the alumina support, the platinum metal, and the alkali metal basic salt.

The catalyst employed in the invention also contains a basic alkali metal compound. Any alkali metal can be used, i.e., sodium, potassium, lithium, cesium, or rubidium, although sodium, potassium, and lithium are preferred. Of these latter three lithium is preferred for reasons described hereinafter. The preferred basic compound is carbonate. The amount of alkali metal basic salt in the catalyst should be 0.1–10% as alkali metal, preferably 1–5%, based on the total catalyst weight. The basic alkali metal compound can be deposited on the alumina support by means analogous to those described above for the incorporation of platinum metal into the catalyst. For example, the alumina support having platinum metal deposited thereon is saturated with an aqueous lithium carbonate solution after which the wet catalyst is heated to, say, 150°–260° C. in order to remove the water.

Various modifications can be made in the procedures described above for incorporating the platinum metal and the basic alkali metal compound into the alumina support. For example, the basic alkali metal compound can be deposited first or they can be deposited simultaneously by employing an aqueous solution containing both a basic alkali metal compound and a platinum compound. It should be noted that the reduction step employed to convert the platinum to platinum metal has essentially no effect on any basic alkali metal compound present on the alumina. In fact even when the platinum metal is deposited first by impregnation and reduction it is preferable to repeat the reduction step after subsequent deposition of the basic alkali metal compound in order to insure maximum catalyst activity. Repetition of the reduction step is avoided if the basic alkali metal basic compound is deposited on the support first. Alternatively the support can be impregnated with the platinum compound then impregnated with the basic alkali metal compound, then subjected to the reduction step.

The catalyst will normally be employed in the form of pellets. The pelleting can be carried out after impregnation of the alumina with the platinum metal and basic alkali metal compound or, alternatively, the alumina support can be formed into pellets after which the platinum metal and basic alkali metal compound are incorporated into the alumina pellets.

There are a number of platinum metal on gamma or eta alumina catalysts available commercially. These catalysts are suitable starting materials for preparing a catalyst suitable for the present purpose.

The method of the invention comprises contacting an alkylnaphthalene, alkyltetralin or alkylbiphenyl of the type described with a catalyst of the type described. In the following description of the method it will be assumed that the starting material is 1-ethylnaphthalene, in which case the product is acenaphthene, and in some cases, acenaphthylene. In the following description and the examples the term selectivity is used. Selectivity (Selec.) refers to the ability of the catalyst to convert the starting material to the desired product or products to the exclusion of undesirable by-products. Thus in the case of 1-ethylnaphthalene as the starting material selectivity refers to the ability of the catalyst to convert the 1-ethylnaphthalene to acenaphthene and acenaphthylene to the exclusion of undesirable by-products and is defined as follows:

Selec. (percent) =

$$\frac{\text{Wt. of Acenaphthene} + \text{Acenapthylene Produced}}{\text{Wt. of All Products Produced}} \times 100$$

The denominator of this fraction does not include any unconverted 1-ethylnaphthalene since same is (1) not a product and (2) not produced.

In the case of an alkylbiphenyl starting material selectivity refers to the ability of the catalyst to convert the alkylbiphenyl to fluorene type compounds. Thus if the starting material is 2-isopropylbiphenyl selectivity refers to the ability of the catalyst to convert this starting material to 9,9-dimethylfluorene (the major product), 9-methylfluorene, or fluorene (the latter two compounds being formed only in very small amounts) and is defined as follows:

Selec. (percent) =

$$\frac{\text{Wt. of 9,9-Dimethylfluorene} + \text{Wt. of Other Fluorene Compounds}}{\text{Wt. of All Products Produced}} \times 100$$

Selectivity with respect to the process using ethyltetralin as starting material is described hereinafter.

The temperature at which the 1-ethylnaphthalene is contacted with the catalyst should be in the range of 360° to 525° C. Below 360° C. the conversion, i.e., the amount of 1-ethylnaphthalene converted to acenaphthene or acenaphthylene is quite low. If acenaphthene is the desired product, the contacting is preferably at a temperature of 375°–475° C. because within this range substantial conversions are obtained and the formation of acenaphthylene is minimized. If acenaphthylene is the desired product the temperature should be in the range of 475°–525° C. because although significant quantities of acenaphthene are formed within this range, the acenaphthylene:acenaphthene ratio is maximized. By way of example, at 475° C. the acenaphthene:acenaphthylene ratio is typically about 4:1 whereas at 500° C. this ratio is typically about 1:1.

The 1-ethylnaphthalene feed preferably contains less than 200 p.p.m. sulfur, more preferably less than 100 p.p.m., in order to retard deactivation of the catalyst. Desulfurization of the feed to these levels can be accomplished by known methods, particularly suitable methods being those well known in the art for desulfurizing the feed to an alkylnaphthalene dealkylation process.

The 1-ethylnaphthalene can be employed in liquid or vapor phase but preferably is employed as a vapor. The pressure at which the contacting is effected is not critical but is preferably atmospheric. If desired, however, pressures as high as 500–3000 p.s.i.g. can be used. If the process is to be carried out as a liquid phase operation sufficient pressure will need to be employed to maintain the starting material as a liquid.

Regardless of whether liquid or vapor phase operation is employed the contacting is preferably carried out in the presence of a solvent for the 1-ethylnaphthalene. For example, the 1-ethylnaphthalene is dissolved in benzene and is then passed through a bed of catalyst maintained at 450° F. and atmospheric pressure. The use of the solvent tends to retard catalyst deactivation. The solvent should, of course, be inert, i.e., it should not enter into any reaction under the conditions at which the contacting of the 1-ethylnaphthalene is carried out. Suitable solvents include benzene, toluene, and aliphatic hydrocarbons such as pentane, hexane, etc.

Catalyst life is also improved by carrying out the contacting in the presence of hydrogen but this is not essential, however, to the conversion of the 1-ethylnaphthalene to acenaphthene. The amount of hydrogen used will normally be in the range of 0.05–50 moles per mole of 1-ethylnaphthalene and preferably the hydrogen partial pressure is not more than 50 p.s.i.g. If desired an inert gas such as nitrogen can be used instead of hydrogen although the latter is preferred.

The rate at which the 1-ethylnaphthalene is contacted with the catalyst can vary considerably but will normally be and preferably is in the range of 0.01 to 50 volumes of liquid 1-ethylnaphthalene per hour per volume of catalyst, i.e., a liquid hourly space velocity (LHSV) of 0.01–50. More preferably the LHSV is in the range of 0.1–10.

The catalyzate, i.e., the entire mixture of compounds which results from contacting 1-ethylnaphthalene with the catalyst, contains acenaphthene, some unconverted 1-ethylnaphthalene, an amount of acenaphthylene which will be either very small or substantial depending upon the temperature employed, and a small amount of other by-products such as naphthalene, methylnaphthalene, vinylnaphthalene, etc. The acenaphthene and acenaphthylene if the latter is present in substantial quantity, can be separated from the catalyzate in any convenient manner. The preferred procedure involves cooling the catalyzate to about room temperature (25° C.) at which temperature the catalyzate is a slurry of solid in liquid. The liquid is unconverted 1-ethylnaphthalene, most of the by-products, and a small amount of acenaphthylene if any was formed. The solid is acenaphthene and acenaphthylene if the latter is formed in significant amount. The solid is separated and then recrystallized from an alcohol such as methanol. Any acenaphthylene in the recrystallized solid is separated from the solid acenaphthene by any convenient procedure such as elution chromatography. Another suitable procedure for separating the acenaphthene and any acenaphthylene in the catalyzate is by elution chromatography of the catalyzate using alumina as the absorbent. Still another procedure is fractional distillation, preferably under vacuum. In using this technique the acenaphthene fraction obtained will usually contain some of any acenaphthylene in the catalyzate because the boiling points of acenaphthylene (265°–275° C.) and acenaphthene (277.5° C.) are quite close. Any acenaphthylene in the acenaphthene fraction can be separated by elution chromatography.

The following examples illustrate the invention more specifically. The examples show not only the operability of the method of the invention but also additional features of the invention. It was mentioned previously that the catalyst employed in the invention contains a basic alkali metal compound. The examples show that this component of the catalyst is responsible for the extremely high selectivity and the substantial conversions that are obtained in the method of the invention. The examples also show that while the incorporation of the basic alkali metal compound in the catalyst distinctly enhances the effectiveness of the catalyst for the cyclodehydrogenation of alkylnaphthalenes, alkyltetralins, and alkylbiphenyls of the type described herein, this is not the case in the cyclodehydrogenation of alkylaromatics generally. In other words the improvement gained by the use of the basic alkali metal compound is peculiar to the specific starting materials specified herein.

*Example I*

In this example catalysts containing gamma and eta alumina supports are prepared. These two types of alumina are identified by X-ray diffraction as follows: the eta alumina has X-ray diffraction peak at 4.6 A. and a singlet at 1.97 A. The gamma alumina has no 4.6 A. diffraction and has twin peaks at 1.98 and 1.95 A. These diffraction characteristics identify these aluminas as eta and gamma. See, for example, the aforesaid Newsome et al. reference.

A series of catalysts are prepared by impregnating eta alumina with aqueous chloroplatinic acid, drying the impregnated alumina on a steam bath in a nitrogen atmosphere, heating the catalyst to 400° C. for 5 hours in a hydrogen atmosphere to reduce the platinum to platinum metal, mixing the platinum on alumina catalyst with an aqueous alkali metal carbonate solution, drying the wet catalyst on a steam bath in a nitrogen atmosphere, and then finally again heating the catalyst to 400° C. for 5 hours in an atmosphere of hydrogen. Three different alkali metal carbonates are used in the procedure described, sodium, potassium, and lithium. The three catalysts thereby obtained have the analyses shown in Table I below, the percentages being by weight of the total catalyst composition and the percentage of basic alkali metal compound being an alkali metal.

TABLE I

| Catalyst | Amount of Platinum | Alkali Metal Basic Salt | |
|---|---|---|---|
| | | Name | Amount |
| | *Percent* | | *Percent* |
| A | 0.7 | $Li_2CO_3$ | 2.4 |
| B | 0.8 | $Na_2CO_3$ | 2.2 |
| C | 0.7 | $K_2CO_3$ | 2.3 |

Another catalyst is prepared by depositing platinum on eta alumina in essentially the same manner as described above. However, no alkali metal compound of any type is deposited on the eta alumina support. The final catalyst contains 0.7% platinum and is identified as catalyst D.

Another catalyst is prepared in the same manner in which catalyst A above is prepared except that gamma alumina is used instead of eta alumina. This catalyst has the same platinum and $Li_2CO_3$ analysis as catalyst A and is identified as catalyst E.

hydrogen is passed through the catalyst bed at a uniform rate of 2.1 moles hydrogen per mole of 1-ethylnaphthalene. The conversion (conv.) shown in Table II is the percentage of the throughput which is converted to acenaphthene or acenaphthylene.

TABLE II

| Run | Catalyst | Temp., °C. | Throughput, gms. | Catalyzate | | | |
|---|---|---|---|---|---|---|---|
| | | | | Wt. Percent Acenaphthene | Wt. Percent Acenaphthylene | Conv. | Selec. |
| 1 | A | 395 | 2.15 | 33.8 | | 36 | 91 |
| 2 | A | 430 | 3.30 | 46.4 | 5.6 | 56 | 90 |
| 3 | A | 445 | 4.30 | 47.2 | 3.1 | 54 | 88 |
| 4 | A | 475 | 10.75 | 38.6 | 10.1 | 52 | 90 |

*Example II*

This example is a series of four runs showing the conversion of 1-ethylnaphthalene to acenaphthene. Each run utilizes a vertically positioned glass catalyst tube 430 mm. long by 15 mm. in diameter. The tube contains 20 ml. of catalyst which are in approximately the center of the tube, the space above and below the catalyst containing inert glass beads. A heating jacket equipped with temperature control means surrounds all of the catalyst bed and all of the catalyst tube except a small portion at the top and a small portion at the bottom. A thermocouple extending into the center of the catalyst bed is used to measure the bed temperature. The 1-ethylnaphthalene is charged at a uniform rate to the top of the catalyst tube by means of a mechanically driven displacement syringe. The top of the catalyst tube is also connected to a source of hydrogen and nitrogen so as to permit passage of either one through the catalyst bed concurrently with the 1-ethylnaphthalene. The bottom of the catalyst tube is connected to a condenser maintained at 15°–25° C. and which is open to the atmosphere. The effluent from the catalyst tube passes into the condenser and is collected therein.

The data in Table II shows the results of four runs in which a feed material containing 93% 1-ethylnaphthalene and 7% 2-ethylnaphthalene is passed through the catalyst bed described above under the following conditions. In each of these four runs catalyst A described previously is used. This catalyst contains $Li_2CO_3$. In each run the LHSV of the feed is 0.5, which is equivalent to a 1-ethylnaphthalene LHSV of 0.465 (.93×.5). The catalyst bed is maintained at the temperature indicated in Table II throughout the run. The total amount of 1-ethylnaphthalene (not the total feed) passed through the catalyst bed in each run is indicated in Table II as throughput. In each run It is apparent from the data contained in Table II that the catalyst employed has an extremely high selectivity for acenaphthene and acenaphthylene. These two products account for approximately 90% of all products formed. The data also show that at a temperature of 475° C. a significant amount of acenaphthylene is formed. At higher temperatures within the 475°–525° C. range larger amounts of acenaphthylene are formed. Substantially the same results as in Runs 1–4 are obtained when other basic lithium compounds as specified herein are employed.

*Example III*

This example is two runs which are the same as Run 2 above except for the catalyst used. In Run 5 catalyst B, which contains $Na_2CO_3$, is used and in Run 6 catalyst C, which contains $K_2CO_3$, is used. The results of Run 5 and 6 are summarized in Table III below.

TABLE III

| Run | Catalyst | Temp., °C. | Throughput, gms. | Catalyzate | | | |
|---|---|---|---|---|---|---|---|
| | | | | Wt. Percent Acenaphthene | Wt. Percent Acenaphthylene | Conv. | Selec. |
| 5 | B | 430 | 3.3 | 43.7 | | 47 | 72 |
| 6 | C | 430 | 3.3 | 43.6 | 2.0 | 49 | 74 |

It is apparent from the data contained in Table III that sodium and potassium carbonate are highly effective for the conversion of 1-ethylnaphthylene to acenaphthene; when other basic sodium or potassium compounds are used the results are substantially the same as those shown in Table III. By comparing the data shown in Table III with the results of Run 2 shown in Table II, it is apparent that catalysts containing basic sodium or potassium compounds are less selective for acenaphthene and acenaphthylene than catalysts containing basic lithium compounds.

*Example IV*

This example is a run the same as Run 2 except that catalyst D, which contains no alkali metal basic salt, is used. The results of this run are summarized in Table IV below. The results of some of the prior runs are also included for ready comparison.

TABLE IV

| Run | Catalyst | Temp., °C. | Throughput, gms. | Catalyzate | | | |
|---|---|---|---|---|---|---|---|
| | | | | Wt. Percent Acenaphthene | Wt. Percent Acenaphthylene | Conv. | Selec. |
| 7 | D | 430 | 3.3 | 18.3 | | 25 | 52 |
| 2 | A | 430 | 3.3 | 46.4 | 5.6 | 56 | 90 |
| 5 | B | 430 | 3.3 | 43.7 | | 47 | 72 |
| 6 | C | 430 | 3.3 | 43.6 | 2.0 | 49 | 74 |

It is apparent from the data contained in Table IV that the inclusion of a basic alkali metal compound effects a distinct improvement in both the conversion and selectivity. The conversion is increased about 100% and the selectivity is increased about 73% in the case where the catalyst contains $Li_2CO_3$ and about 25% in the case where the catalyst contains $Na_2CO_3$ and $K_2CO_3$.

*Example V*

This example is a run (No. 8) which is identical to Run 1 in all respects except that nitrogen instead of hydrogen is passed through the catalyst bed concurrently with the feed. The nitrogen rate is the same as the hydrogen rate in Run 1. The results are essentially the same as in Run 1 which shows that the presence of hydrogen is not essential. It is desirable, nevertheless, for the reason mentioned previously.

*Example VI*

This example is a run (No. 9) which is identical to Run 1 in all respects except that catalyst E is employed. This catalyst comprises platinum metal and lithium carbonate deposited on gamma alumina rather than eta alumina as in Run 1. The results are essentially the same as in Run 1.

*Example VII*

This example is a run (No. 10) which is the same as Run 2 except the temperature is 420° C., the throughput is 2.0 g., and the feed is 2.0 g. of 2-isopropylbiphenyl dissolved in 6 mls. of benzene. The results of this run are as shown in Table V below. The conversion in Table V is the percentage of the 2-isopropylbiphenyl and is converted to fluorene products.

contains $Li_2CO_3$ while in Run 12 the catalyst contains no alkali metal basic salt. The amount of naphthalene formed is substantially higher in Run 12 than in Run 11 which shows that the incorporation of a basic alkali metal compound in a platinum on alumina catalyst does not enhance the effectiveness of the catalyst for the dehydrocyclization of aromatics generally.

*Example VIII*

This example is two runs, 13 and 14, which are the same as Runs 11 and 12 respectively except that the feed material is n-amylbenzene. This material would dehydrocyclize, if at all, to methylnaphthalene. In Run 13, in which the catalyst contains $Li_2CO_3$, the catalyzate contains essentially no, i.e., less than 2%, methylnaphthalene while in Run 14, in which the catalyst contains no alkali metal basic salt, the catalyzate contains 25% methylnaphthalene. This confirms the conclusion drawn in Example VII.

*Example IX*

This example is two runs, 15 and 16, which are the same as Run 2 except for the following: In Run 15 the feed is 1-ethyltetralin and in Run 16 the feed is 1,4-diethyltetralin. In both runs the temperature is 450° C. and hydrogen is passed through the catalyst bed at the rate of about 1 mole per mole of feed. In each run the LHSV is 1.0–1.5. In both runs the feed is first mixed with n-heptane as a solvent in the ratio of 3 volumes solvent per volume of feed. The results of the two runs are as shown in Tables VI and VII below. In Run 15 the conversion is defined the same as in Table II and the selectivity is the amount of the two products shown in the

TABLE V

| Run | Catalyst | Temp., ° C. | Throughput, gms. | Catalyzate | | | |
|---|---|---|---|---|---|---|---|
| | | | | Wt. Percent 9,9-dimethylfluorene | Wt. Percent Fluorene+9-methylfluorene | Conv. | Selec. |
| 10 | A | 420 | 2.0 | 60.7 | 8.2 | 75.4 | 91 |

It is apparent from the data contained in Table V that 2-alkyl-2'-unsubstituted biphenyls are converted with high selectivity to fluorene compounds by the $Li_2CO_3$—Pt on alumina catalyst. Catalysts containing basic sodium and potassium compounds are also highly selective for fluorene compounds but their selectivity is slightly less than that of the catalysts containing lithium.

*Example VIII*

This example is two runs, 11 and 12, employing n-butylbenzene as the feed material. This material would dehydrocyclize, if at all, to naphthalene. Run 11 is the same as Run 1 supra except that the temperature is 420° C. instead of 395° C. while Run 12 is the same as Run 1 except that the temperature is 420° C. and the catalyst used is catalyst D. In other words in Run 11 the catalyst table formed as a percentage of the weight of all products formed. However, any 1-ethylnaphthalene formed is ignored as a "product formed" in determining selectivity inasmuch as it can be readily converted to acenaphthene or acenaphthylene as shown in the previous examples. In other words selectivity indicates the ratio of desired to undesired products and 1-ethylnaphthalene is not, in view of another embodiment of my invention, an undesired product.

In Run 16 no significant amount of pyracene, pyracyclene, or acenaphthylene type compounds are formed hence the conversion is the percentage of the throughput converted to acenaphthene or ethylacenaphthene. The comments with regard to Run 15 about selectivity also apply to Run 16.

TABLE VI

| Run | Catalyst | Temp., ° C. | Throughput, gms. | Catalyzate | | | |
|---|---|---|---|---|---|---|---|
| | | | | Wt. Percent Acenaphthene | Wt. Percent Acenaphthylene | Conv. | Selec. |
| 15 | A | 450 | 1.75 | 15 | 1 | 26 | 100 |

TABLE VII

| Run | Catalyst | Temp., °C. | Throughput, gms. | Catalyzate | | | |
|---|---|---|---|---|---|---|---|
| | | | | Wt. Percent Acenaphthene | Wt. Percent Acenaphthylene | Conv. | Selec. |
| 16 | A | 450 | 1.75 | 7 | 15 | 22 | 88 |

The results of Runs 15 and 16 show that 1-ethyl-8-unsubstituted tetralins are suitable starting materials for the present purpose and that they are converted in high selectvity to the products described.

Although the above examples show the use of 1-ethylnaphthalene, 2-isopropylbiphenyl, 1-ethyltetralin, and 1,4-diethyltetralin as the feed, analogous results are obtained when other 1-ethyl-8-unsubstituted naphthalenes, 2-alkyl-2'-unsubstituted biphenyls, and 1-ethyl-8-unsubstituted tetralins of the type described hereinbefore are employed, the only significant difference being the specific products obtained.

The invention claimed is:

1. Method which comprises contacting a hydrocarbon material selected from the group consisting of 1-ethyl-8-unsubstituted-naphthalenes, 1-ethyl-8-unsubstituted-tetralins, and 2-alkyl-2'-unsubstituted-biphenyls, wherein said alkyl group contains 1–3 carbon atoms, with a catalyst, said contacting being at a temperature in the range of 360°–525° C. and being for a time sufficient to effect cyclization of said ethyl groups or said alkyl group and said catalyst comprising a support selected from the group consisting of gamma and eta alumina, said support having deposited thereon 0.05–4.0% platinum metal and 0.1–10.0%, as alkali metal, of a basic alkali metal compound selected from the group consisting of oxide, hydroxide, carbonate, and bicarbonate.

2. Method according to claim 1 wherein said temperature is in the range of 375°–475° C.

3. Method according to claim 1 wherein the amount of platinum metal is 0.2–2.0% and wherein the amount of basic alkali metal compound is 1–5%.

4. Method according to claim 3 wherein said temperature is in the range of 375°–475° C.

5. Method according to claim 1 wherein said alumina support has a surface area of at least 275 square meters per gram.

6. Method according to claim 1 wherein said contacting is carried out in the presence of a solvent for said material.

7. Method according to claim 1 wherein said contacting is carried out in the presence of hydrogen.

8. Method according to claim 1 wherein said alkali metal is lithium.

9. Method according to claim 8 wherein said basic compound is carbonate.

10. Method acording to claim 1 wherein said basic compound is carbonate.

11. Method according to claim 1 wherein said material is 1-ethylnaphthalene.

12. Method according to claim 1 wherein said material is 2-isopropylbiphenyl.

13. Method according to claim 1 wherein said material is 1-ethyltetralin.

14. Method according to claim 1 wherein said material is selected from the group consisting of 1-ethyl-8-unsubstituted tetralins and 1-ethyl-8-unsubstituted naphthalenes and wherein a catalyzate is recovered which contains a compound selected from the class consisting of acenaphthene and alkyl derivatives thereof.

15. Method according to claim 14 wherein the catalyzate recovered contains, in addition to a compound of the class recited in claim 14, a compound selected from the group consisting of acenaphthylene and alkyl derivatives thereof.

16. Method which comprises contacting a 1-ethyl-8-unsubstituted-naphthalene hydrocarbon with a catalyst, said contacting being at a temperature in the range of 475°–525° C. and being for a time sufficient to effect cyclization of said ethyl groups or said alkyl group, said catalyst comprising a support selected from the group consisting of gamma and eta alumina, said support having deposited thereon 0.05–4.0% platinum metal and 0.1–10.0%, as aklali metal, of a basic alkali metal compound selected from the group consisting of oxide, hydroxide, carbonate, and bicarbonate, and recovering a catalyzate containing a compound selected from the group consisting of acenaphthylene, and alkyl derivatives thereof.

References Cited

UNITED STATES PATENTS 2,503,292  4/1950  Orchin et al. _____ 260—670

DELBERT E. GANTZ, *Primary Examiner.*

C. R. DAVIS, *Assistant Examiner.*